J. H. STEINER.
APPARATUS FOR PRODUCING AND CARBURETING HYDROGEN GAS.
No. 98,442.             Patented Dec. 28, 1869.
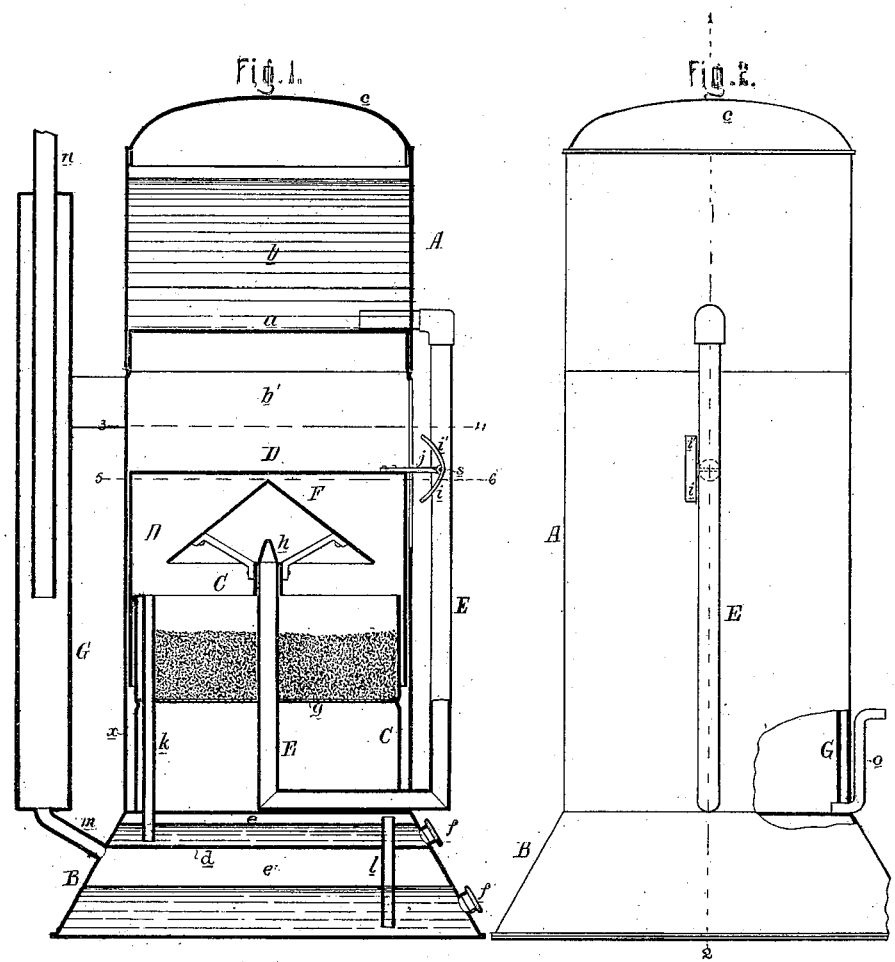
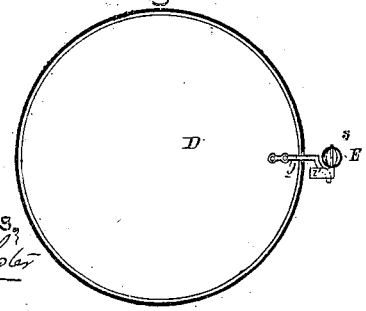
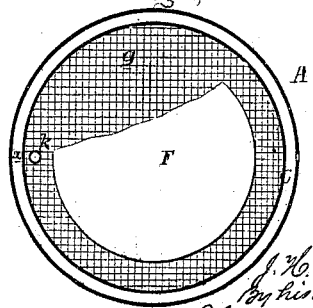

UNITED STATES PATENT OFFICE.

JOHN H. STEINER, OF PHILADELPHIA, PENNSYLVANIA, ASSIGNOR TO HIMSELF AND CHRISTIAN SHARPS, OF SAME PLACE.

IMPROVEMENT IN APPARATUS FOR PRODUCING AND CARBURETING HYDROGEN GAS.

Specification forming part of Letters Patent No. 98,442, dated December 28, 1869.

*To all whom it may concern:*

Be it known that I, JOHN H. STEINER, of Philadelphia, county of Philadelphia, State of Pennsylvania, have invented Improved Apparatus for Producing Carbureted Hydrogen Gas, of which the following is a specification:

My invention consists in manufacturing hydrogen gas by passing acidulated water through a mass of metal particles, instead of by immersing a mass of metal in the solution, as heretofore; also, in so treating the gas before carbureting it that it shall carry no moisture into the carbureting-chamber.

My invention further consists of certain apparatus, fully described hereinafter, for manufacturing and carbureting the gas.

Referring to the accompanying drawings, Figure 1 is a sectional elevation of a gas generator and carbureter, illustrating my improvements; Fig. 2, an exterior elevation, partly in section; Fig. 3, a transverse section on the line 3 4, Fig. 1; Fig. 4, a transverse section on the line 5 6, Fig. 1.

A is a casing, which may be of a cylindrical or other form, and which is divided by a partition, $a$, into two compartments, $b$ and $b'$, the upper compartment, $b$, which is the smallest, being covered by a cap, $c$. The casing rests on a flanging base, B, which is divided longitudinally by a partition, $d$, into two chambers, $e$ and $e'$, access to each of which may be obtained through an opening, to which is fitted a screw-plug, $f$.

At the lower part of the casing A is a smaller case, C, across the center of which extends a perforated partition, $g$, and into the annular space $x$, between the casings C A, extends the vertical portion of an inverted vessel or gasometer, D.

A pipe, E, extends from the lower part of the compartment $b$ to the outside of the casing A, downward and along the bottom of the casing to the center of the same, and then upward to a point above the upper edge of the casing C, where it terminates in a nozzle, $h$, and above the latter is suspended a conical deflecting-plate, F. In the pipe E is a cock, $s$, which is provided with two curved arms, $i$ $i'$, so arranged as to be struck by a pin, $j$, on the vessel D as the latter reaches the limit of its downward movement and when it begins to ascend.

A tube, $k$, extends from the top of the casing C nearly to the bottom of the chamber $e$, a tube, $l$, from the upper part of the chamber $e$ nearly to the bottom of the chamber $e'$, and the latter chamber communicates through a tube, $m$, with a tubular casing, G, through the top of which passes a tube, $n$, connected with the distributing-pipes. With the lower part of the casing C communicates a waste-pipe, $o$, Fig. 2, which extends upward outside of the casing A to a point just below the bottom of the perforated partition $g$.

Operation: The annular space $x$ is filled with water or other suitable liquid to within three inches, or thereabout, of the top of the case C. The chamber $b$ is supplied with water diluted with about one-tenth its volume of sulphuric acid, and the casing C, above the partition $g$, is nearly filled with scraps or filings of iron or impure zinc. The chamber $e$ is partly filled with lime-water, and the chamber $e'$ with gasoline or other volatile hydrocarbon liquid. On turning the cock $s$ the acidulated water passes into the lower part of the pipe E, and, issuing in a small stream from the nozzle $h$, strikes the distributing-plate F, and is directed outward and downward onto the metal scraps in the case C. As soon as the liquid is brought in contact with the metal, hydrogen gas is evolved, and its production continues as long as fresh solution is supplied to the metal.

As the gas is produced, the vessel or gasometer D will rise, and as the pin $j$ strikes the arm $i'$, the cock $s$ will be turned until it is completely closed, and the further passage of solution through the tube is arrested.

The small portion of liquid which remains for a short time in contact with the metal is sufficient to continue the generation of gas until the gasometer attains, or nearly attains, the limit of its upward movement. On withdrawing gas from the distributing-pipes, the weight of the gasometer D forces the contents through the pipe $k$ into the chamber $e$, through the pipe $l$ into the chamber $e'$, and thence through the casing G and pipe $n$ into the distributing-pipes.

As the gas passes through the lime-water it is effectually dried and cleansed, so that it will not carry with it any moisture into the chamber e', where it passes through the carburetting-liquid and becomes impregnated with hydrocarbon vapor, any excess of the latter carried by the gas being condensed within the tube G.

As the gasometer D becomes exhausted it descends, and as it reaches the limit of its downward movement its pin j strikes the arm i, and turns the cock s, so as to permit an additional supply of acidulated water to be thrown onto the metal to produce another volume of gas, the supply of liquid being again cut off on the ascension of the gasometer, as before.

It will be seen that the acidulated liquid does not remain in contact with the mass of metal, but quickly leaves the latter after passing through the interstices, and I have found that a much more rapid generation of the gas may be thus effected than by maintaining the metal and liquid in contact in the ordinary manner. Owing to the length of the pipe o, the liquid which collects in the lower part of the case C is withdrawn before it can rise to the height of the partition g. Inasmuch as fresh acidulated water is continually supplied to the metal, the gradual weakening of the solution and the constant decrease in the amount of gas generated in a given time, which results when the whole body of liquid remains in constant contact with the metal, is avoided.

Inasmuch as the mass of metal is stationary, a much greater amount can be treated at one time than is possible where the metal is so arranged as to be elevated out of the liquid to stop the generation of the gas.

It will be apparent that other devices than those described may be employed for regulating the passage of the acidulated liquid on the movements of the gasometer, and for effecting the distribution of the liquid over and through the metal, and that the relative positions of the gasometer, supply-chamber, and washing and carbureting chambers may be altered without departing from the main features of my invention.

I claim—

1. Generating hydrogen gas by treating a mass of iron or zinc scraps or filings with acidulated water, which is caused to pass through the mass of metal without being retained in contact with the same.

2. The combination, with a receptacle containing a mass of zinc or iron scraps, of a reservoir containing acidulated water, which is passed among the particles of metal, and from the same, either continuously or intermittently, for the purpose described.

3. The combination of a gasometer, a chamber containing a supply of acidulated water, and devices whereby the passage of the liquid from the chamber is regulated on the movement of the gasometer, for the purpose set forth.

4. A deflector, F, arranged in respect to a pipe, E, for distributing a fluid over a mass of metal below the deflector, substantially as set forth.

5. The combination of the metal receptacle, a chamber below the same, and a waste-pipe so arranged as to prevent the liquid from reaching the metal after passing from contact with the same.

In testimony whereof I have signed my name to this specification in the presence of two subscribing witnesses.

JOHN H. STEINER.

Witnesses:
CHARLES E. FOSTER,
HARRY SMITH.